(12) United States Patent
Stevens

(10) Patent No.: US 11,358,054 B2
(45) Date of Patent: Jun. 14, 2022

(54) SYSTEMS AND METHODS FOR TRANSCRIBING USER INTERFACE ELEMENTS OF A GAME APPLICATION INTO HAPTIC FEEDBACK

(71) Applicant: Electronic Arts Inc., Redwood City, CA (US)

(72) Inventor: Karen Elaine Stevens, Maitland, FL (US)

(73) Assignee: ELECTRONIC ARTS INC., Redwood City, CA (US)

(*) Notice: Subject to any disclaimer, the term of this patent is extended or adjusted under 35 U.S.C. 154(b) by 143 days.

(21) Appl. No.: 16/793,968

(22) Filed: Feb. 18, 2020

(65) Prior Publication Data

US 2021/0252392 A1 Aug. 19, 2021

(51) Int. Cl.
*A63F 13/285* (2014.01)
*G06F 3/01* (2006.01)
*G06F 40/47* (2020.01)
*H04L 67/131* (2022.01)

(52) U.S. Cl.
CPC .......... *A63F 13/285* (2014.09); *G06F 3/016* (2013.01); *G06F 40/47* (2020.01); *H04L 67/38* (2013.01)

(58) Field of Classification Search
CPC ........ A63F 13/285; G06F 40/47; G06F 3/016; H04L 67/38
See application file for complete search history.

(56) References Cited

U.S. PATENT DOCUMENTS

| | | | |
|---|---|---|---|
| 7,159,008 B1 | 1/2007 | Wies et al. | |
| 7,493,365 B2 | 2/2009 | Wies et al. | |
| 8,337,305 B2* | 12/2012 | Aronzon | G06F 40/263 463/36 |
| 9,177,452 B1* | 11/2015 | Mosterman | G06F 8/10 |
| 2006/0255683 A1* | 11/2006 | Suzuki | G05G 5/03 310/317 |
| 2012/0242590 A1* | 9/2012 | Baccichet | A63F 13/533 345/173 |
| 2013/0214914 A1* | 8/2013 | Grant | G06F 3/016 340/407.1 |
| 2016/0132209 A1* | 5/2016 | Abe | G06F 3/0488 715/834 |
| 2019/0366213 A1* | 12/2019 | Zhou | A63F 13/20 |
| 2020/0264703 A1* | 8/2020 | Leake | G06F 3/016 |

FOREIGN PATENT DOCUMENTS

JP 2018-049669 A 3/2018
KR 10-2006-0098596 9/2006

* cited by examiner

*Primary Examiner* — David L Lewis
*Assistant Examiner* — Shauna-Kay Hall
(74) *Attorney, Agent, or Firm* — Knobbe, Martens, Olson & Bear, LLP

(57) ABSTRACT

The present invention introduces an in-game API wrapper to perform identification and transcription of in-game visual and audio data by way of identifiable tags. Identified tags for visual and audio data are sent to an external audio API for transcribing into Morse code. The Morse code transcribing is sent back to the in-game API wrapper for transcription into haptic feedback. Identified tags for available on-screen button selections are transcribed by the in-game API wrapper into haptic feedback.

20 Claims, 12 Drawing Sheets

System Overview

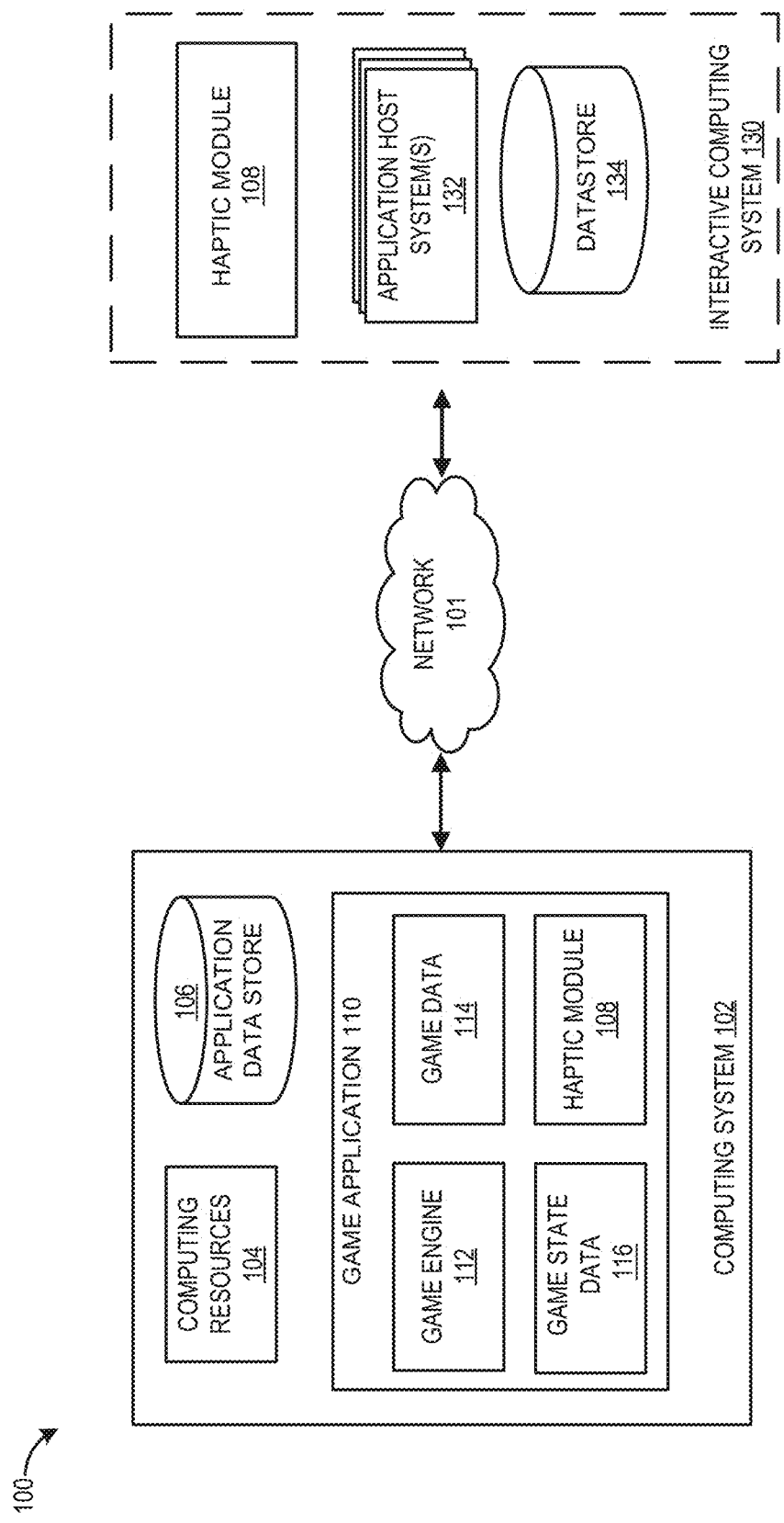
FIG. 1 – System Overview

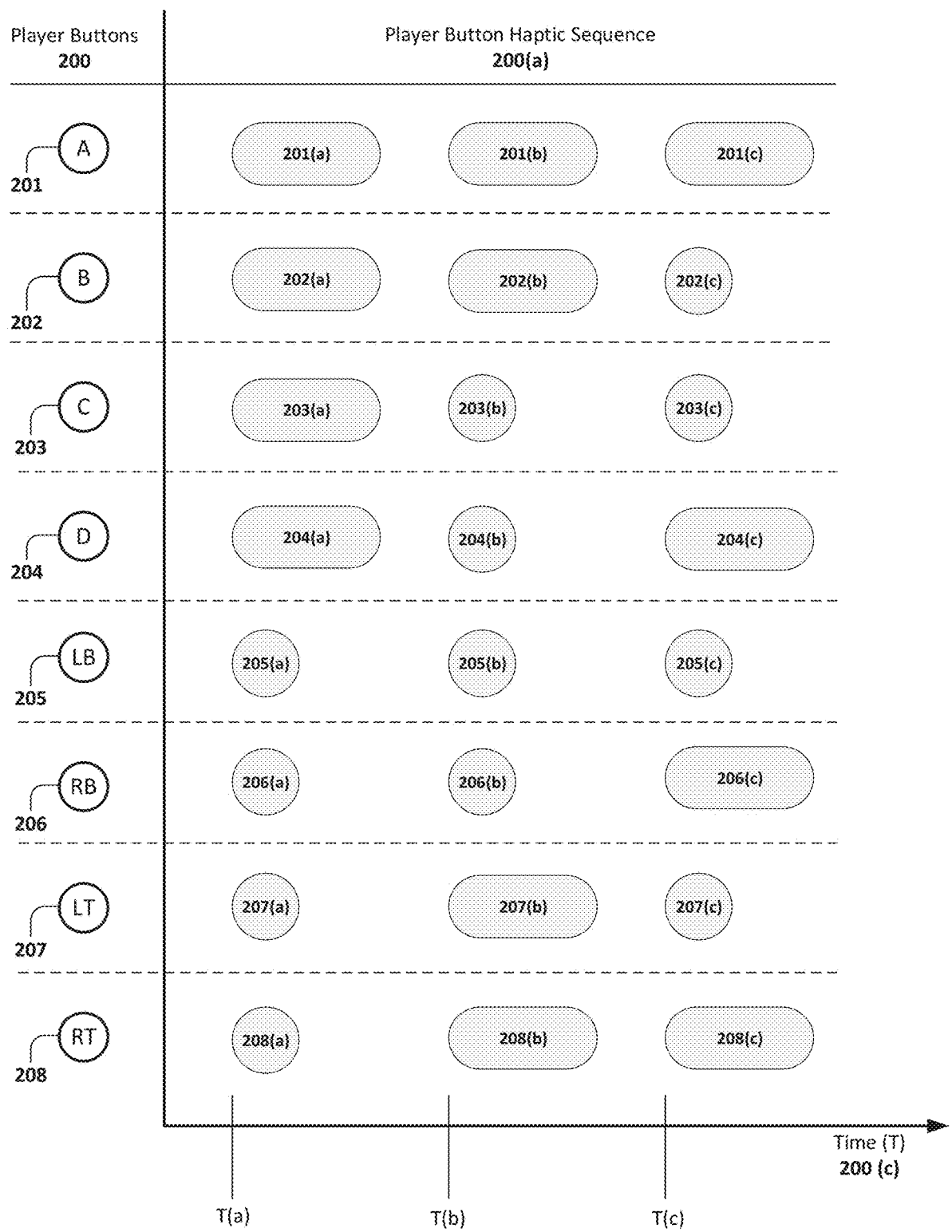
FIG. 2A Haptic Feedback Sequence for Player Buttons

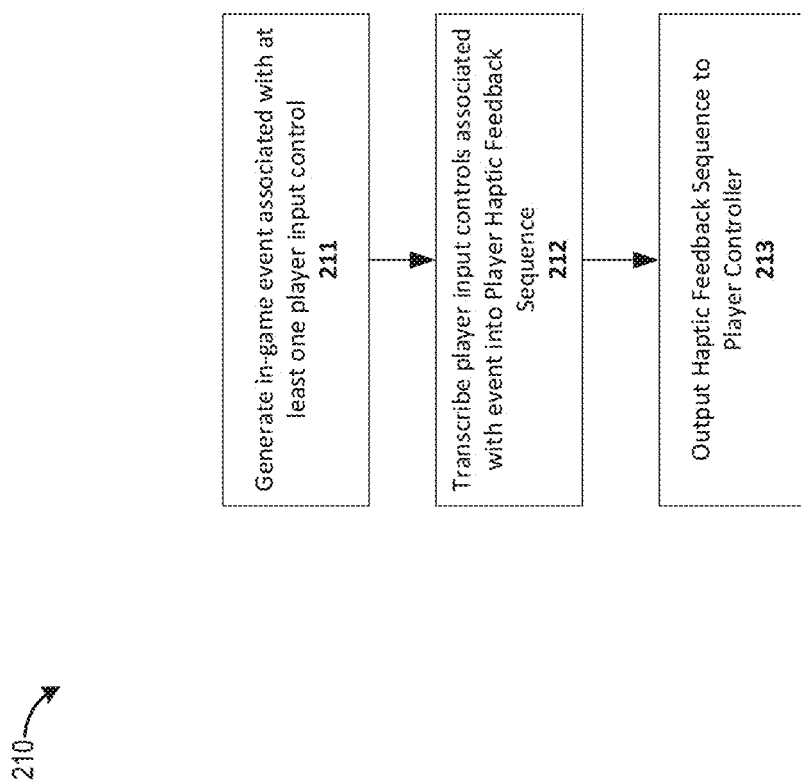
FIG. 2B Haptic Feedback Translation Process

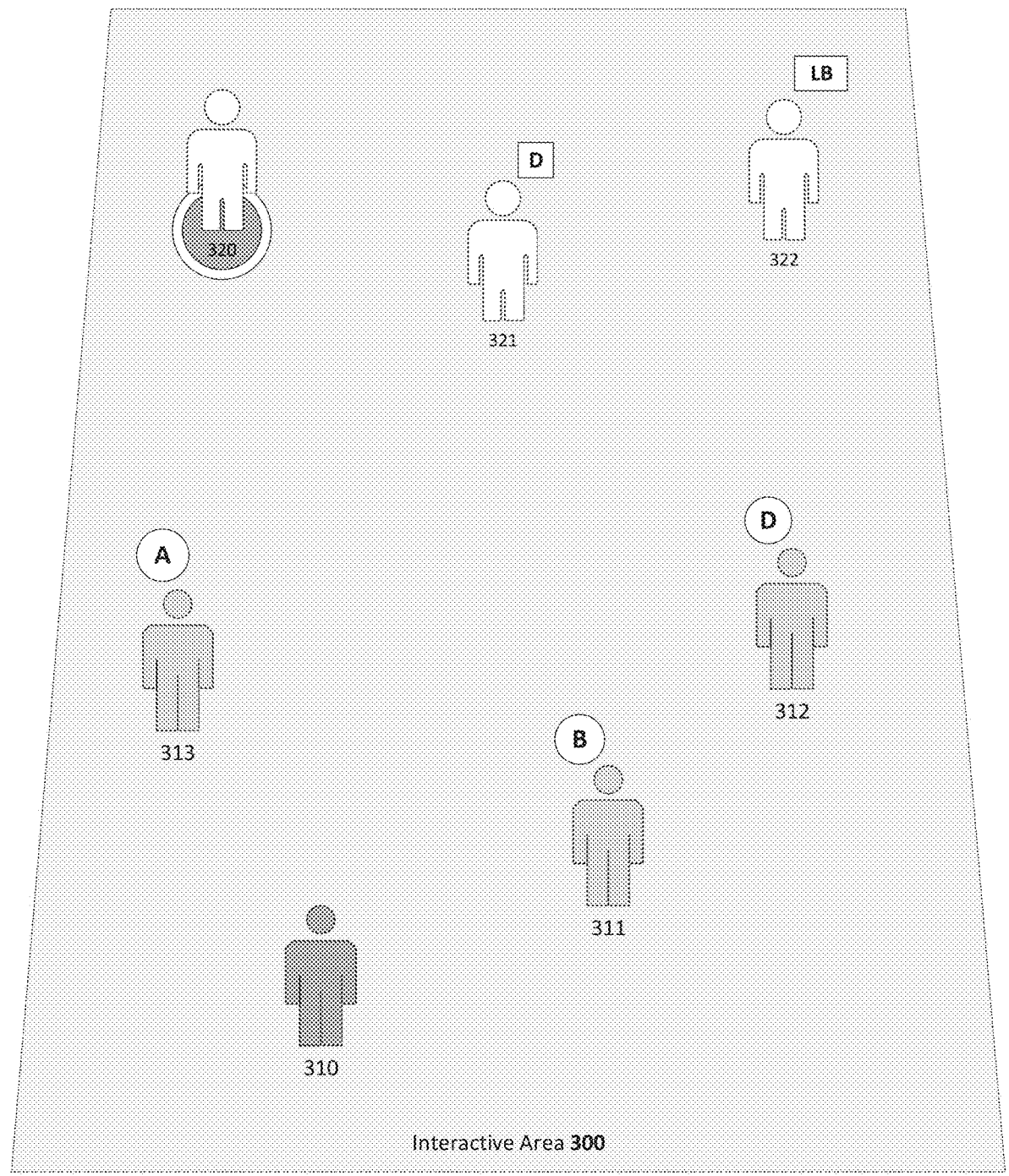
FIG. 3 Multiplayer Interactive Area

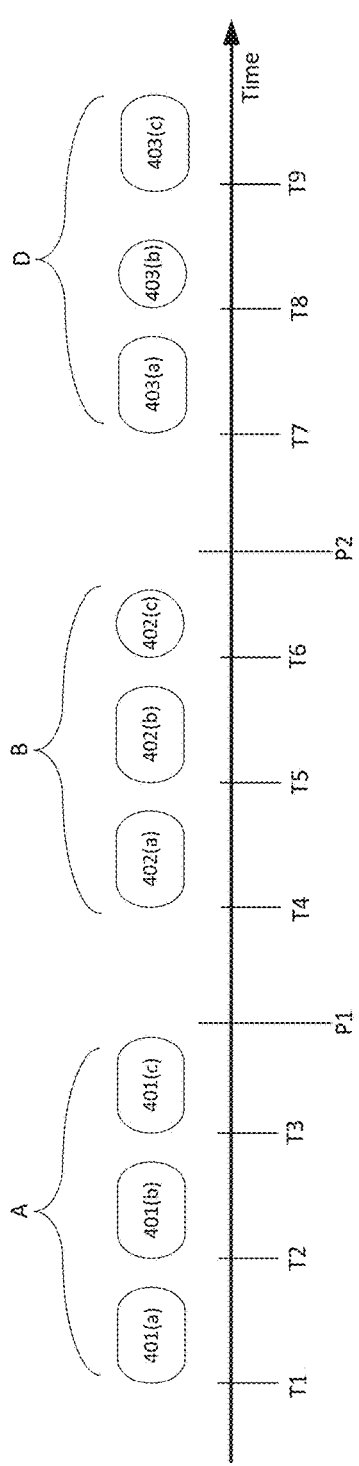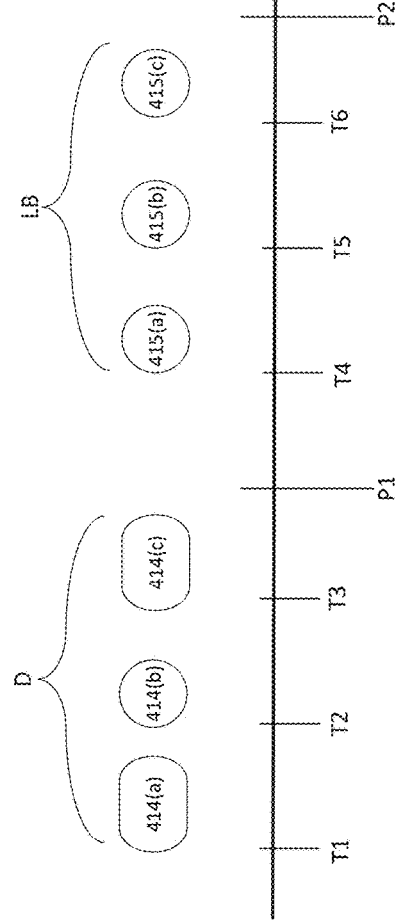
FIG. 4 Player Button Translations as Haptic Feedback

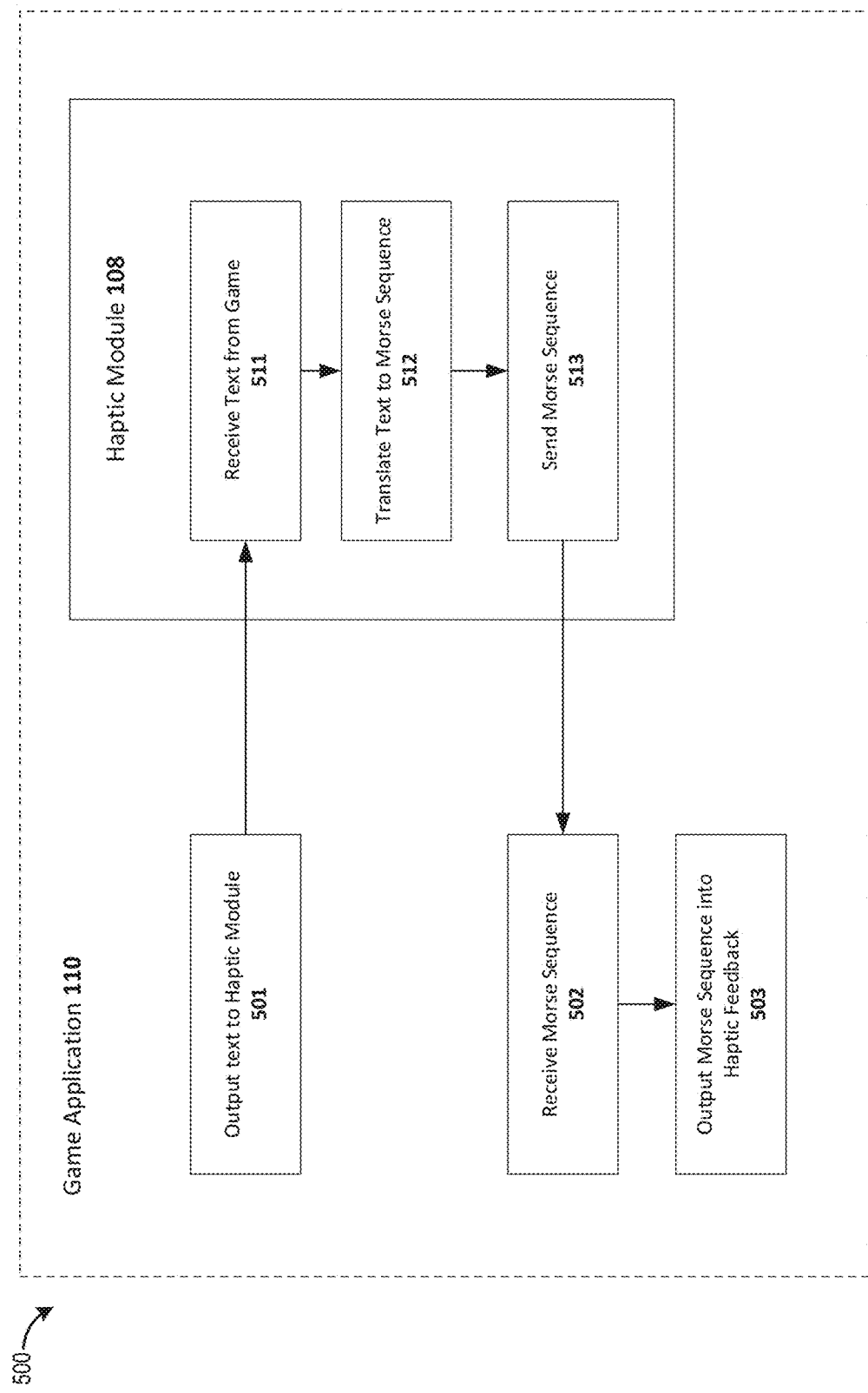
FIG. 5 Text to Morse Haptic Feedback Translation Process

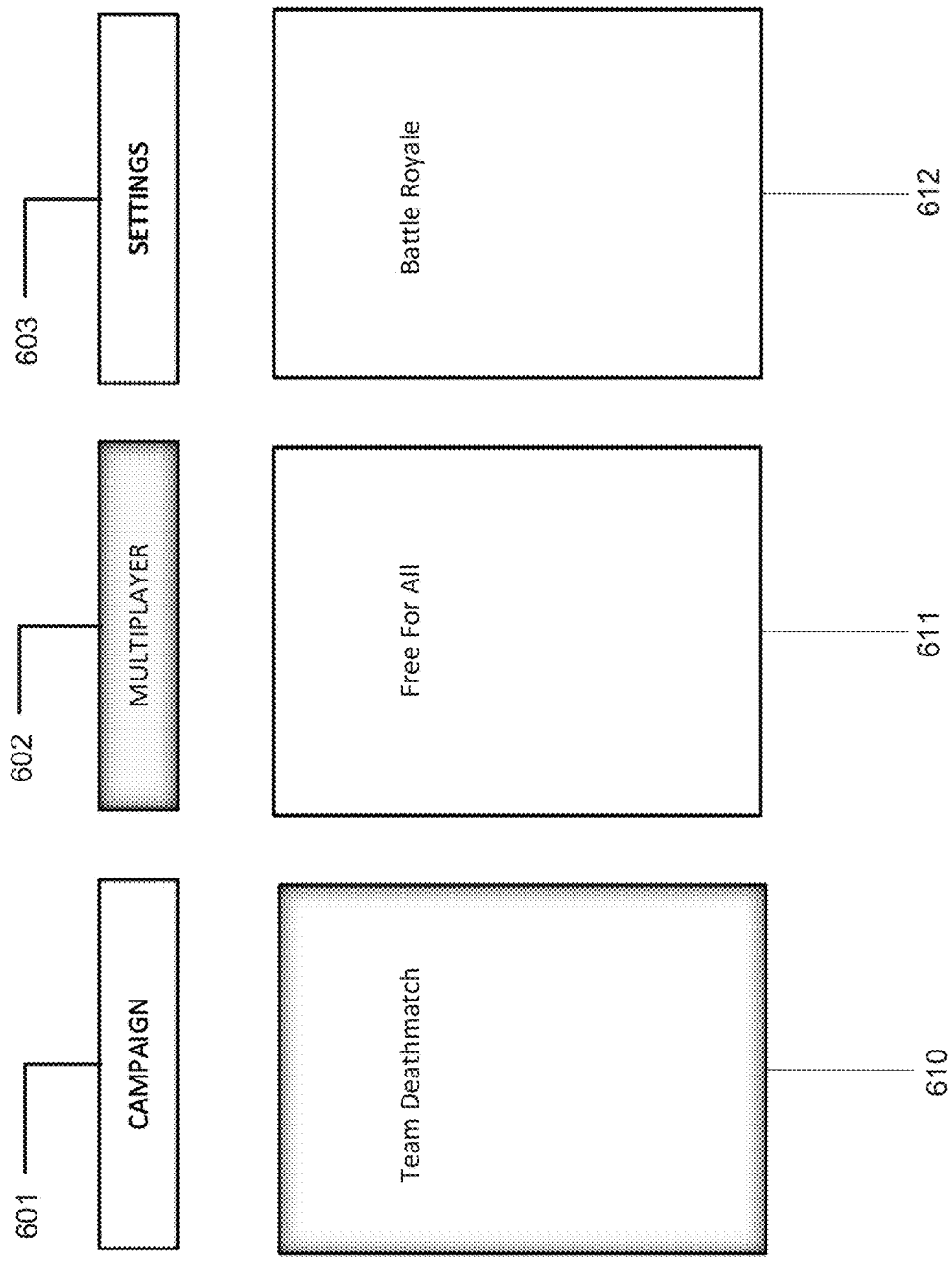
FIG. 6 Virtual Interactive Environment Menu

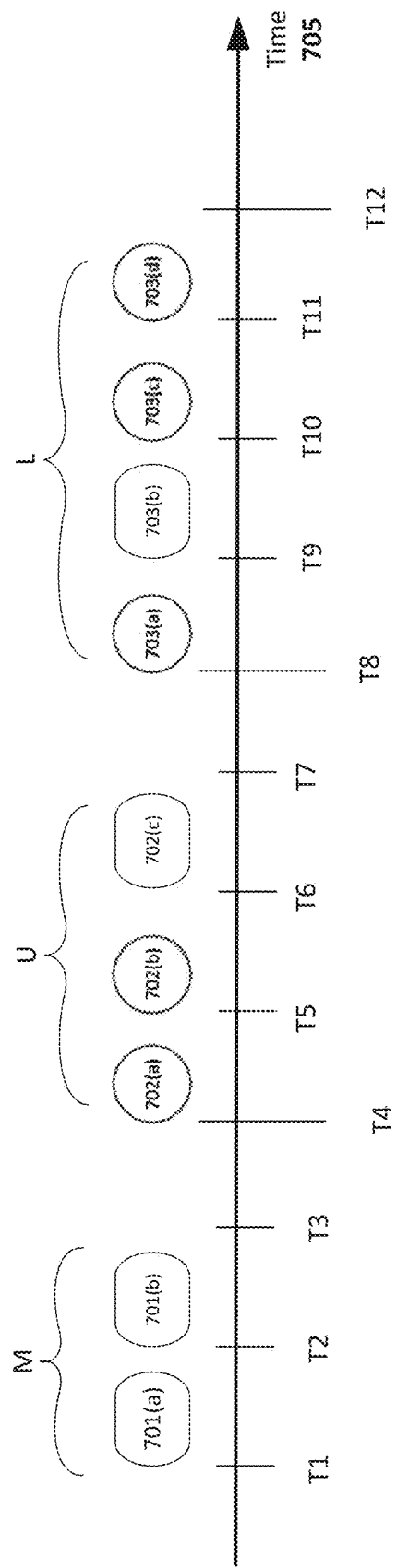
FIG. 7 Menu Text Translation As Morse Haptic Feedback

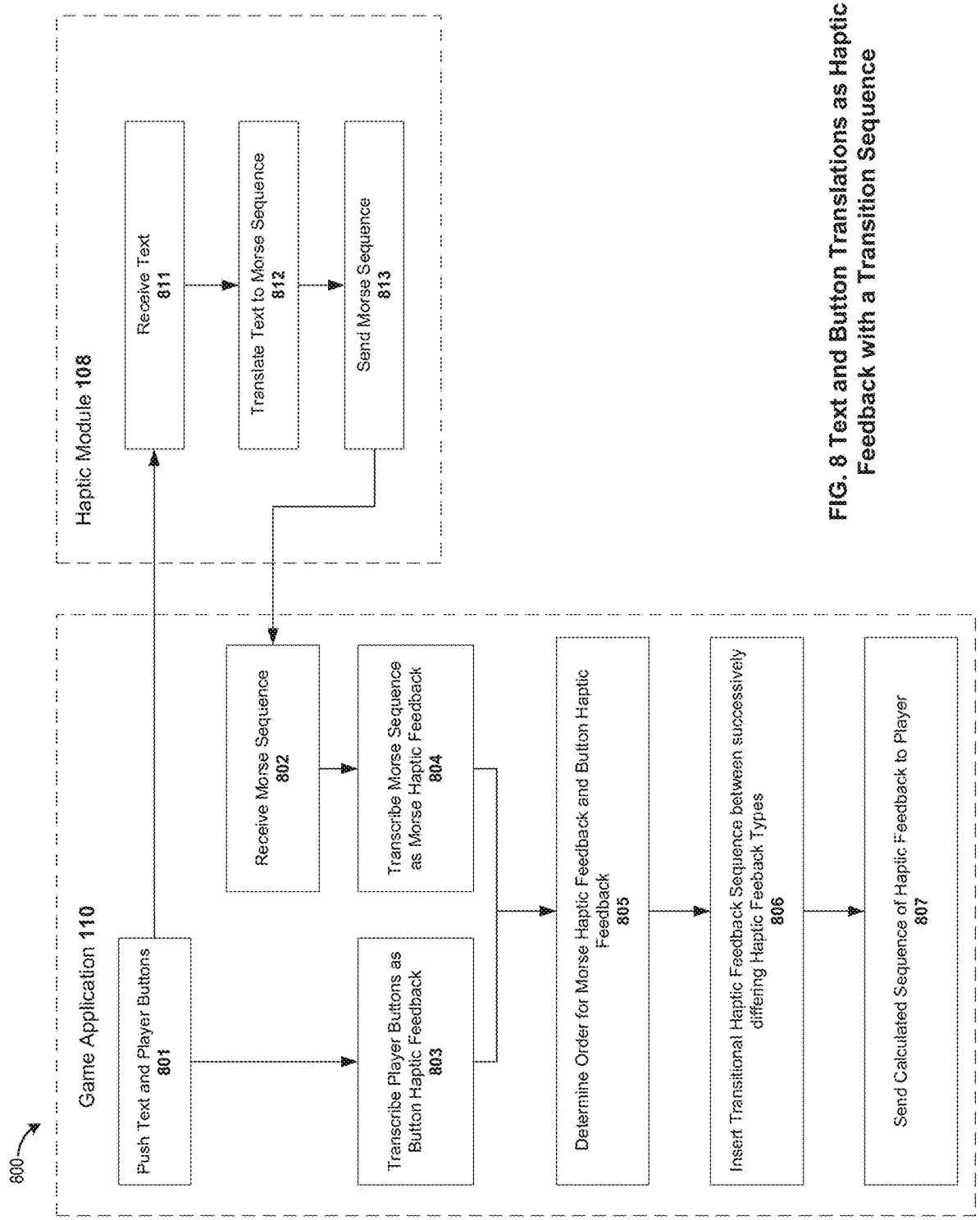
FIG. 8 Text and Button Translations as Haptic Feedback with a Transition Sequence

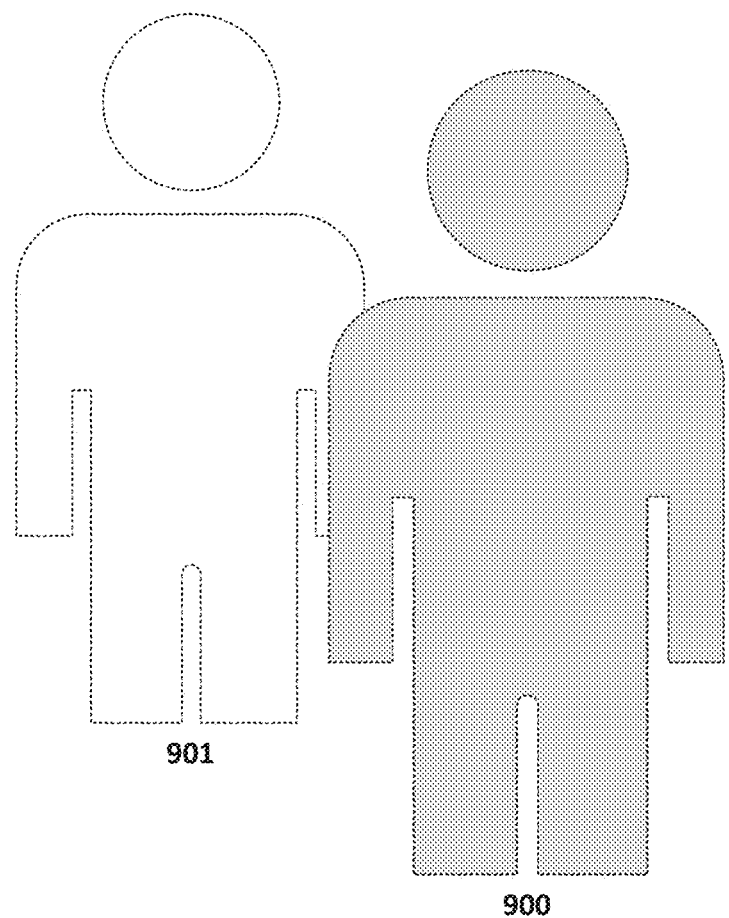
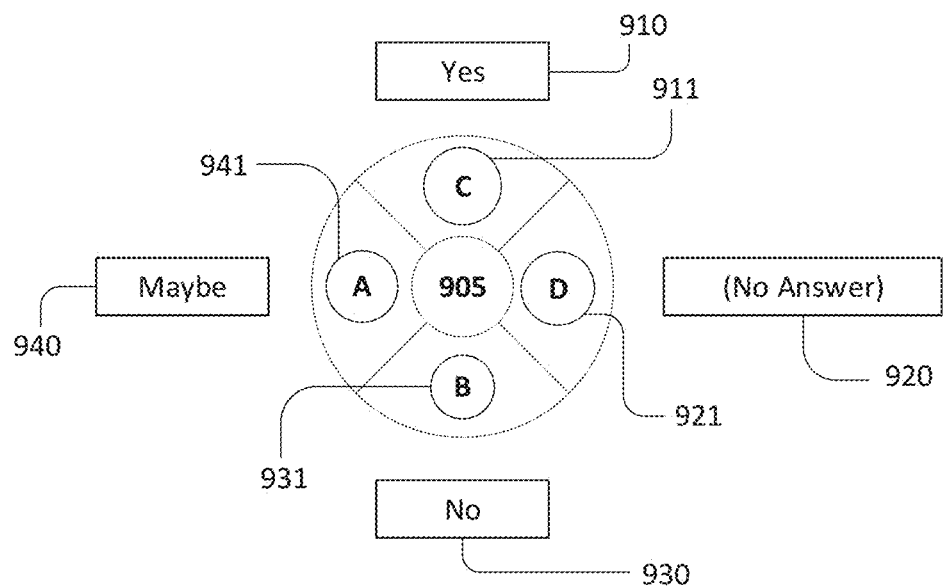
FIG. 9 Dialogue Objective with Player Buttons and Text

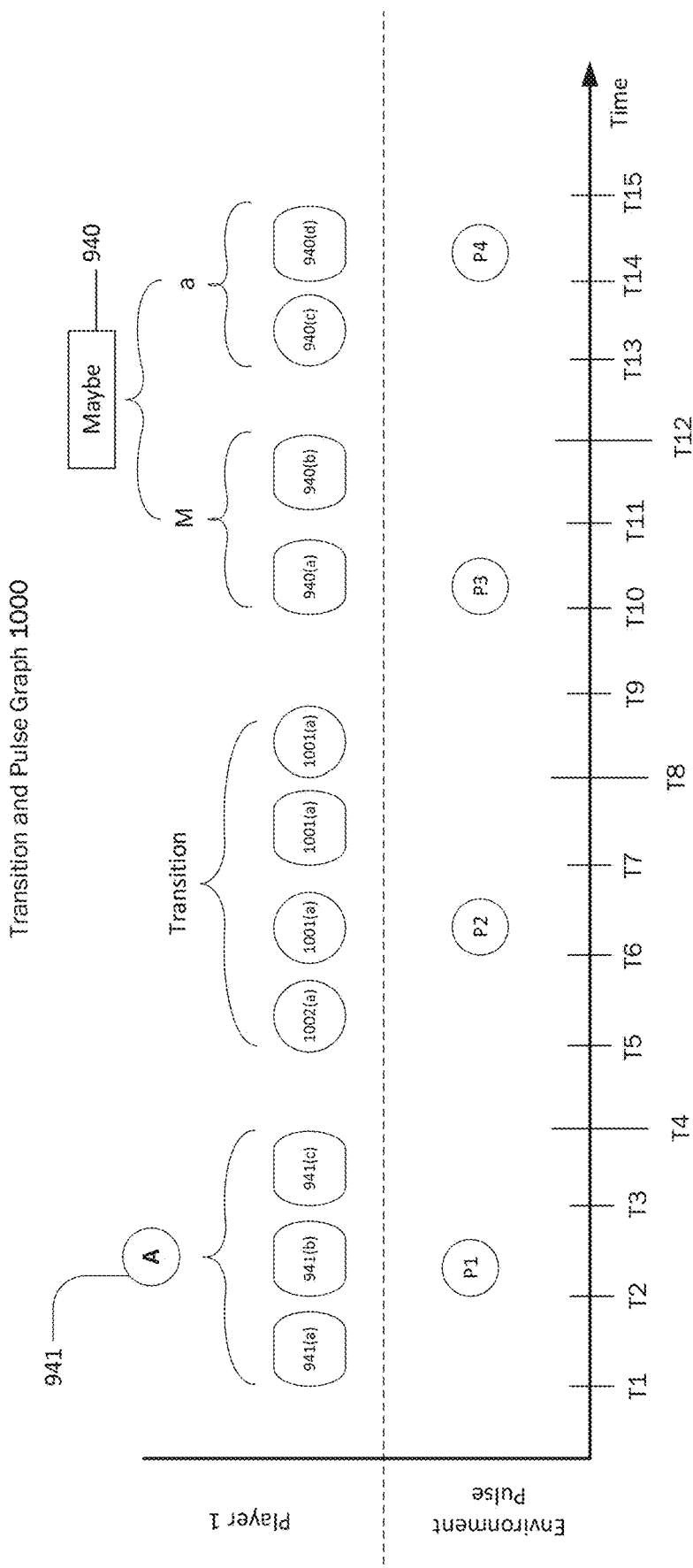
FIG. 10 Player Button and Text Translation as Haptic Feedback with a Transitional and Pulse Sequence

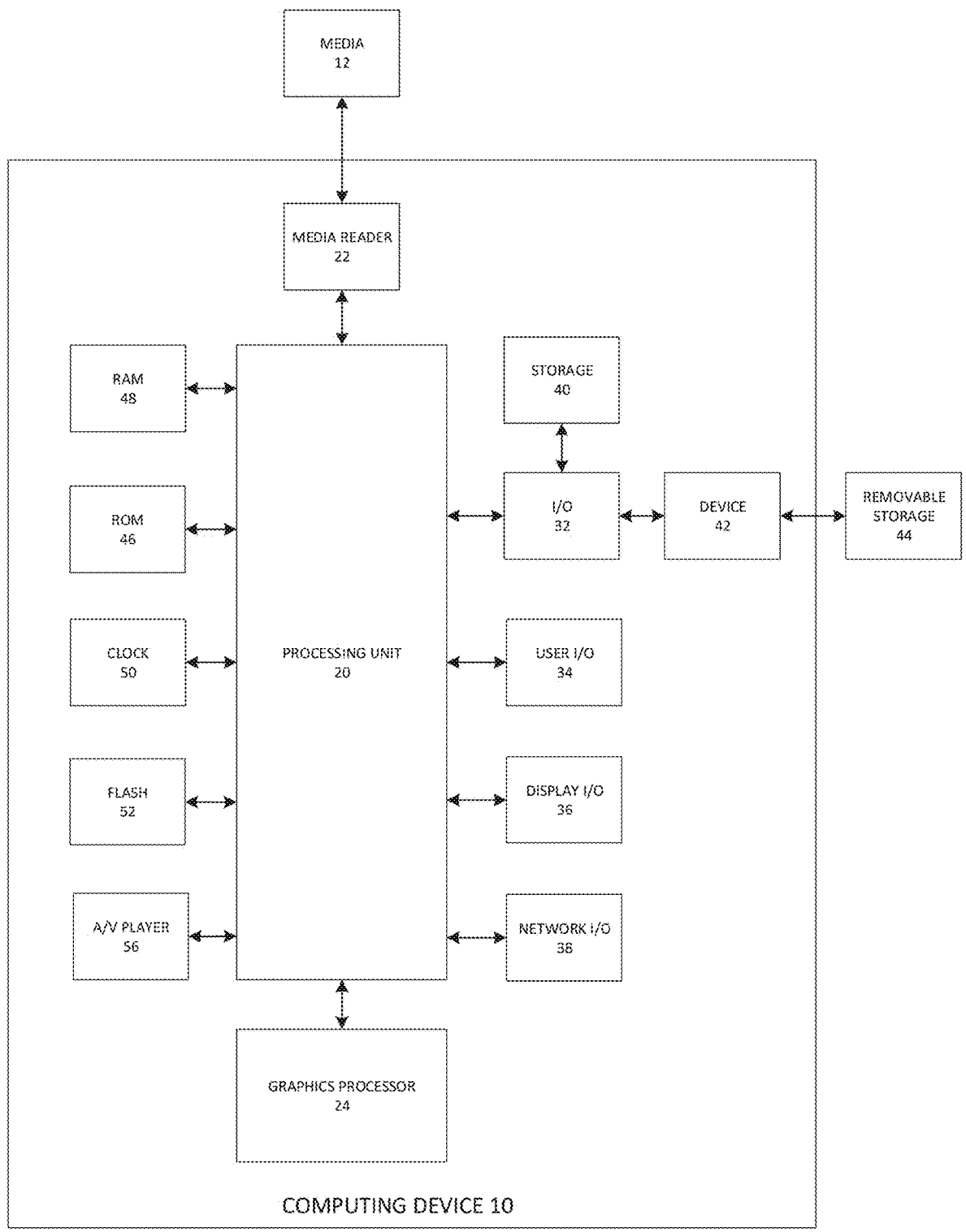
FIG. 11 Computing System

SYSTEMS AND METHODS FOR TRANSCRIBING USER INTERFACE ELEMENTS OF A GAME APPLICATION INTO HAPTIC FEEDBACK

BACKGROUND

Modern game applications, such as video games, predominantly convey information through visual graphics and audio. However, the dominance of auditory and graphical conveyance of information in game applications causes interpretation issues for users with visual impairments and users with hearing impairments.

Users who are hearing or visually impaired can experience the issue of missing vital information conveyed through a medium they cannot physically perceive or hear. This limitation makes it difficult and unenjoyable for hearing impaired users and visually impaired users to navigate and progress through a game application. As such, a system and method for conveying information to hearing impaired and visually impaired users through haptic feedback is advantageous.

SUMMARY OF SOME EMBODIMENTS

One embodiment includes a computer-implemented method for generating haptic feedback sequences during a gameplay session of a game application, the method comprising; by a computing system comprising at least one hardware processor configured with computer executable instructions, executing an instance of a gameplay session of a game application, the instance of the gameplay session comprising a virtual environment and one or more user controlled virtual entities; generating an in-game event within the virtual environment comprising controller inputs displayed to a user, wherein the controller inputs indicate one or more input controls of a controller device a user can actuate in response to the in-game event; transcribing the controller inputs displayed to a user into one or more haptic feedback sequences, wherein the one or more haptic feedback sequences comprise a series of signals that uniquely identify each of the controller inputs; and sending the one or more haptic feedback sequences to at least one controller device, wherein the series of signals of the one or more haptic feedback sequences are configured to actuate at least one haptic actuator on the at least one controller device.

Various embodiments of the method may include one, all, or any combination of the following features. In some embodiments, the method includes generating text within the virtual environment; translating the text to Morse code; and transcribing the Morse code into one or more Morse haptic feedback sequences. In some embodiments, the method includes determining an order for the one or more haptic feedback sequences and the one or more Morse haptic feedback sequences to be sent to a controller device of the user operating in conjunction with the computing device executing the game application. In some embodiments, the method includes inserting one or more transitional haptic feedback sequences between each of the one or more button haptic feedback sequences and the one or more Morse haptic feedback sequences to create a full haptic feedback sequence. In some embodiments, transcribing the text displayed to the includes pushing the text displayed to a user to a translating shim, the translating shim configured with machine-readable instructions for identifying the text displayed to the user and calling an external API for translating the identified the text displayed to the user into Morse code. In some embodiments, a full haptic sequence is sent to a plurality of controller devices operating in conjunction with the computing device executing the game application to support multiple users in a game application. In some embodiments, the Morse haptic feedback sequence comprises machine readable instructions for physically rotating one or more actuators in the controller device operating in conjunction with the computing device. In some embodiments, the haptic feedback sequence comprises machine readable instructions for physically rotating one or more actuators in the controller device operating in conjunction with the computing device. In some embodiments, the haptic feedback sequence comprises machine readable instructions for actuating a plurality of haptic actuators on the controller device.

Another embodiment includes a system comprising; at least one hardware processor configured with machine-readable instructions executable on a computing device that configure the at least one hardware processor to: execute an instance of a gameplay session of a game application, the instance of the gameplay session comprising a virtual environment and one or more user controlled virtual entities; generate an in-game event within the virtual environment comprising controller inputs displayed to a user, wherein the controller inputs indicate one or more input controls of a controller device a user can actuate in response to the in-game event; transcribe the controller inputs displayed to a user into one or more haptic feedback sequences, wherein the one or more haptic feedback sequences comprise a series of signals that uniquely identify each of the controller inputs; and send the one or more haptic feedback sequences to at least one controller device, wherein the series of signals of the one or more haptic feedback sequences are configured to actuate at least one haptic actuator on the at least one controller device.

Various embodiments of the method may include one, all, or any combination of the following features. In some embodiments, the machine-readable instructions are further configured to: generate text within the virtual environment; translate the text to Morse code; and transcribe the Morse code into one or more Morse haptic feedback sequences. In some embodiments, the machine-readable instructions are further configured to determine an order for the one or more haptic feedback sequences and the one or more Morse haptic feedback sequences to be sent to a controller device of the user operating in conjunction with the computing device executing the game application. In some embodiments, the machine-readable instructions are further configured to insert one or more transitional haptic feedback sequences between each of the one or more haptic feedback sequences and the one or more Morse haptic feedback sequences to create a full haptic feedback sequence. In some embodiments, the haptic feedback sequences comprises machine readable instructions for actuating a first haptic actuator on the controller device and the transitional haptic feedback sequences comprises machine readable instructions for actuating a second haptic actuator on the controller device. In some embodiments, transcribing the text displayed to the user includes pushing the text displayed to a user to a translating shim, the translating shim configured with machine-readable instructions for identifying the text displayed to the user and calling an external API for translating the identified text displayed to the user into Morse code. In some embodiments, a full haptic sequence is sent to a plurality of controller devices operating in conjunction with the computing device executing the game application to support multiple users in a game application. In some embodiments, the Morse haptic feedback sequence comprises machine readable instructions for physically rotating one or more actuators in the controller device operating in conjunction with the computing device. In some embodiments, the haptic feedback sequence comprises machine readable instructions for physically rotating one or more actuators in the controller device operating in conjunction with the computing device. In some embodiments, the haptic feedback sequence comprises machine readable instructions for actuating a plurality of haptic actuators on the controller device. In some embodiments, the instance of the gameplay state of the game application is a shared state of the game application executing on multiple computing devices.

BRIEF DESCRIPTION OF THE DRAWINGS

The present disclosure is illustrated by way of example, and not by way of limitation, and can be more fully understood when considered in connection with the figures in which:

FIG. 1 illustrates an embodiment of computing environment implementing a haptic feedback transcription system.

FIG. 2A illustrates a graph of haptic feedback transcription for player buttons.

FIG. 2B depicts a block diagram of the player button to haptic feedback transcribing process.

FIG. 3 illustrates a multiplayer interactive area with player buttons in game application.

FIG. 4 illustrates a graph for player button transcription as haptic feedback.

FIG. 5 depicts a block diagram of the text to Morse haptic feedback transcribing process.

FIG. 6 illustrates a game application menu.

FIG. 7 illustrates a graph for menu text translation as Morse haptic feedback.

FIG. 8 depicts a block diagram of the player button and text transcribing as haptic feedback with a transition sequence.

FIG. 9 illustrates a dialogue objective with player button selections for dialogue selections in a game application menu.

FIG. 10 illustrates an example embodiment of a transitional haptic feedback sequence and pulse sequence.

FIG. 11 depicts a block diagram of an illustrative computer system operating in accordance with examples of the invention.

DETAILED DESCRIPTION

Aspects of the present disclosure address the interpretation issue experienced by hearing impaired and visually impaired users of game applications; by transcribing user interface elements into haptic feedback sequences.

A game application is a software environment, such as a video game, executable on a computing device, that enables one or more users to interact within a virtual environment. In some embodiments, a virtual environment includes virtual objects, characters, and user interface elements that one or more users can interact with by way of selectable inputs received from a controller device operating in conjunction with a computing device executing the game application. Across embodiments, a game application may include, but is not limited to, stand-alone and online video games, virtual reality experiences, augmented reality environments, interactive animated media, and geolocation based augmented experiences.

A user interface is any graphical representation that indicates information of game application or any portion thereof, including but not limited to, game state data, events, objective, other users, dialogue subtitles, descriptions, selectable user actions, locations, points of interests, and other identifiers of the like.

A haptics module can include a translating shim that functions as a library that communicates with a game application for the purpose of managing language translation. In some embodiments, a language translation is any auditory or text-based translation from one language to another, including Morse Code. The haptic module can include a transcribing shim that can transcribe information into haptic feedback sequences. As used herein, the terms "transcription" and "transcribing" can refer to the process of converting data from format to another. For example, the transcribing shim can transcribe text data into haptic feedback sequences, transcribe Morse code (that was previously translated from text) into haptic feedback sequences, and/or transcribe user interface elements into haptic feedback sequences, and/or transcribe other types of data to haptic feedback sequences.

In some embodiments, a translating shim and/or a transcribing shim may be an internal part of the game application. In alternative embodiments, the translating shim and/or the transcribing shim may exist outside of the game application. In preferred embodiments, a translating shim bridges the translating process of text to Morse code between a game application and external API library, such that the game application need only be configured to call the translating shim to receive an external haptic feedback sequence of transcribed text in a recognizable and usable format. To simplify, but not limit, the present disclosure, steps of translating shims performing external API calls are omitted, but implied; as commonly known by one skilled in the art.

A haptic feedback sequence is any configurable haptic output signal executable on a controller device of a user. One skilled in the art should recognize that haptic feedback is conveyed to users from game applications via software commands to hardware devices possessing actuators, such as smartphones, controllers, keyboards, portable gaming devices, remotes, headsets, smartwatches, digital wristbands, digital vests, and other devices containing actuators of the like. One skilled in the art should recognize the three types of actuation signals that can be sent to hardware devices from a game application; length, intensity, and type. A length actuation signal provides a hardware device with a duration for haptic feedback. An intensity actuation signal provides a hardware device the degree of intensity for haptic feedback.

An actuation signal provides a hardware device with a signal to enable a specific actuator for haptic feedback. One skilled in the art should also recognize that the types of signals may be configured as either a binary signal or variable signal based on the capabilities of the hardware device.

In alternative embodiments, a game application may convey haptic feedback as an auditory bass frequency to hardware with the capacity to induce an identifiable physical sensation to a user including, but not limited to, wearable bass producing devices, headphones, headsets, home-theater speakers, and other devices of the like.

Users of a game application are herein referenced as "players" of a game application. Equivocally, a game application is illustrated as a "video game" to which a "player" plays.

The detailed description and figures illustrated are portrayed by way of example of the invention, not limitation; to demonstrate one of many possible configurations for a haptic module to encode button and text information into a haptic feedback sequence.

System Overview

FIG. 1 illustrates an embodiment of a computing environment 100 for implementing a haptic feedback transcription system. The environment 100 includes a network 101, a user computing system 102, and an interactive computing system 130, the interactive computing system 130 includes the haptic module 108.

The computing systems 102 may communicate via a network 101 with the interactive computing system 130. Although only one network 101 is illustrated, multiple distinct or distributed networks 101 may exist. The network 101 can include any type of communication network. For example, the network 101 can include one or more of a wide area network (WAN), a local area network (LAN), a cellular network, an ad hoc network, a satellite network, a wired network, a wireless network, and so forth. In some embodiments, the network 101 can include the Internet.

Computing System

The computing system 102 includes computing resources 104 and an application data store 106. The user computing system 102 may have varied local computing resources 104 such as central processing units and architectures, memory, mass storage, graphics processing units, communication network availability and bandwidth, and so forth. Further, the user computing system 102 may include any type of computing system. For example, the user computing system 102 may be any type of computing device, such as a desktop, laptop, video game platform/console, television set-top box, television (for example, Internet TVs), network-enabled kiosk, car-console device, computerized appliance, wearable device (for example, smart watches and glasses with computing functionality), and wireless mobile devices (for example, smart phones, PDAs, tablets, or the like), to name a few. A more detailed description of an embodiment of a computing system 102 is described below with respect to FIG. 4.

Game Application

The user computing system 102 can include a game application 110 installed thereon. The user computing system 102 can execute a game application 110 based on software code stored at least in part in the application data store 106. The game application 110 may also be referred to herein as a video game, a game, game code or a game program. A game application 110 should be understood to include software code that a computing device 102 can use to provide a game for a user to play. A game application 110 may include software code that informs a computing device 102 of processor instructions to execute, but may also include data used in the playing of the game, such as data relating to game simulation, rendering, animation, and other game data. In the illustrated embodiment, the game application 110 includes a game engine 112, game data 114, and game state data 116. When executed, the game application 110 is configured to generate a virtual environment for a user to interface with the game application 110.

In some embodiments, the user computing system 102 can execute machine readable instructions that are configured to execute the game application 110, such as a video game, stored on a data store on the user computing system (for example, application data store 106). The game application 110 may be stored or executed in a distributed environment using a client/server architecture. For example, the user computing system 102 may execute a portion of a game application 110 and the interactive computing system 130, or an application host system 132 of the interactive computing system 130 may execute another portion of the game application 110. For instance, the game application 110 may be a competitive multiplayer online game, such as a battle royale type game, that includes a client portion executed by the user computing system 102 and a server portion executed by one or more application host systems 132. For the present discussion, the game application 110 can execute locally on the user computing system 102 or can execute as a distributed application that includes a portion that executes on the user computing system 102 and a portion that executes on at least one of the application host systems 132.

Game Engine

During operation, the game engine 112 executes the game logic, controls execution of the simulation of gameplay, and controls rendering within the game application 110. In some cases, the game engine 112 controls characters, the environment, execution of the gameplay, how the game progresses, or other aspects of gameplay based on one or more stored rule sets. For example, the game engine 112 can monitor gameplay and detect or determine a current runtime state of the game application 110. Based at least in part on the current runtime state of the game application, the game engine 112 applies a rule set to control the characters or the environment.

In some embodiments, the game engine 112 can include a simulation engine and a presentation engine. The simulation engine executes the game logic and controls execution of the gameplay simulation. The presentation engine controls execution of presentation of the gameplay and rendering of frames. In some embodiments, the game engine 112 can execute the functionality of the simulation engine and the presentation engine using different engines and/or processes within the game application.

The simulation engine can control execution of individual virtual components, virtual effects or virtual objects within the game application 110. The simulation engine can manage and determine character movement, character states, collision detection, derive desired motions for characters based on collisions, or the like. Input device(s) allow for user input to be received from the user in order to control aspects of the game application according to rule sets. The simulation engine receives the user inputs and determines character events, such as actions, collisions, runs, throws, attacks and other events appropriate for the game. The character events can be controlled by character movement streams that determine the appropriate motions the characters should make in response to events. The simulation engine can interface with a physics engine that can determine new poses for the characters. The physics engine can have as its inputs, the skeleton models of various characters, environmental settings, character states such as current poses (for example, positions of body parts expressed as positions, joint angles or other specifications), and velocities (linear or angular) of body parts and motions provided by a character movement module, which can be in the form of a set of force/torque vectors for some or all body parts. From this information, the physics engine generates new poses for the characters using rules of physics and those new poses can be used to update character states.

The simulation engine can output graphical state data (e.g., game state data 116) that is used by presentation engine to generate and render frames within the game application 110. In some embodiments, each virtual object can be configured as a state stream process that is handled by the simulation engine. Each state stream process can generate graphical state data for the presentation engine. For example, the state stream processes can include emitters, lights, models, occluders, terrain, visual environments, and other virtual objects with the game application 110 that affect the state of the game.

The presentation engine can use the graphical state data to generate and render frames for output to a display within the game application 110. The presentation engine can combine the virtual objects, such as virtual characters, animate objects, inanimate objects, background objects, lighting, reflection, and the like, in order to generate a full scene and a new frame for display. The presentation engine can take into account the surfaces, colors textures, and other parameters of the virtual objects. The presentation engine can then combine the virtual objects (for example, lighting within the virtual environment and virtual character images with inanimate and background objects) to generate and render a frame. During runtime, the game engine can output many frames per second (e.g., 30 FPS, 60 FPS, or any other number of frames per second as determined during execution of the game application).

Game Data

The game data 114 can include rule sets, prerecorded motion capture poses/paths, environmental settings, environmental objects, constraints, skeleton models, route information, or other game application information.

Rule sets can be applied by the game engine 112 to control characters, the environment, execution of the gameplay, how the game progresses, or other aspects of gameplay. The rule sets can define the specific way in which players (for example, player characters or non-player characters) or the environment behaves or interacts within the video game. For example, the rules sets can correspond to difficulty levels (for example, easy, normal, hard, novice, expert) of a video game. As another example, the rule sets can control a number of resources available to a player, a number of challenges a player must face to progress through the video game, rules for scoring, possible inputs, actions, events, movement in response to inputs, or the like. Further still, for instance in sports-related video games, the rules set can control a degree of skill or ability of a particular virtual player, team, or coach, or can dictate how virtual entities react to particular in-game situations, such as a breakaway, a 3-on-1 attack, a 3-on-1 defense, or the like. In some cases, rule sets can function as a virtual entities' brain or artificial intelligence.

The rule sets can be described using the concepts of characters, actions, runtime states, and environments. The virtual character in the video game can be a player character, which is controlled by a user, or a non-player character, which is controlled by the game application, and an action can be a move from a set of all possible moves the character can make. For example, in a hockey game, the character can pass (action A) or shoot (action B) the puck, among other possible actions. A runtime state can be described as a concrete and immediate situation in which the character finds itself. For example, the runtime state can be a specific place and moment, such as an instantaneous configuration that puts the character in relation to other significant things like tools, obstacles, enemies or prizes. A virtual environment can be described as the virtual world through which the character interacts with the game application. In general, a rule or rule set can define a character's way of behaving (for example, the character's actions) at a given time, runtime state, and environment.

At least a portion of the game data 114 can be stored in the application data store 106. In some embodiments, a portion of the game data 114 may be received or stored remotely, such as in the data store 134. Game data may be received during runtime of the game application 110. For example, in some cases, one or more rule sets can be received, stored, or applied during runtime of the game application 110.

Game State Data

During runtime of the game application 110, the game application 110 can collect or store game state data 116, which can include a game state, character states, environment states, scene object storage, route information, or information associated with a runtime state of the game application 110. For example, the game state data 116 can identify the state of the game application 110 at a specific point in time, such as a character position, character orientation, character action, game level attributes, and other information contributing to a state of the game application 110. The game state data can include simulation game state data and graphical game state data. The simulation game state data can include game state data that is used by the game engine 112 to execute the simulation of the game application 110. The graphical game state data can include game state data that is generated based on the simulation state data and is used to generate and render frames for output on a display.

Virtual Environment

As used herein, a virtual environment may include a simulated environment (for example, a virtual space) instanced on a user computing system 102, a server (for example, the interactive computing system 130) that is accessible by a client (for example, user computing system 102) located remotely from the server, to format a view of the virtual environment for display to a user of the client. The simulated environment may have a topography, express real-time interaction by the user, or include one or more objects positioned within the topography that are capable of locomotion within the topography. In some implementations, the topography may be a two-dimensional topography. In other instances, the topography may be a three-dimensional topography. In some implementations, the topography may be a single node. The topography may include dimensions of the virtual environment, or surface features of a surface or objects that are "native" to the virtual environment. In some implementations, the topography may describe a surface (for example, a ground surface) that runs through at least a substantial portion of the virtual environment. In some implementations, the topography may describe a volume with one or more bodies positioned therein (for example, a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (for example, gravity, a landscape, etc.). By way of illustration, the well-known game Tetris may be formed as a two-dimensional topography in which bodies (for example, the falling tetrominoes) move in accordance with predetermined parameters (for example, falling at a predetermined speed, and shifting horizontally or rotating based on user interaction).

The game instance of the video game application 110 may include a simulated virtual environment, for example, a virtual environment that is accessible by users via clients (for example, user computing systems 102) that present the views of the virtual environment to a user. The virtual environment may have a topography, express ongoing real-time interaction by one or more users or include one or more objects positioned within the topography that are capable of locomotion within the topography. In some instances, the topography may include a two-dimensional topography. In other instances, the topography may include a three-dimensional topography. The topography may include dimensions of the space or surface features of a surface or objects that are "native" to the space. In some instances, the topography may describe a surface (for example, a ground surface) that runs through at least a substantial portion of the space. In some instances, the topography may describe a volume with one or more bodies positioned therein (for example, a simulation of gravity-deprived space with one or more celestial bodies positioned therein). The instance executed by the computer components may be synchronous, asynchronous, or semi-synchronous.

It should be understood the above description of the manner in which state of the virtual environment associated with the video game is not intended to be limiting. The game application 110 may be configured to express the virtual environment in a more limited, or richer, manner. For example, views determined for the video game representing the game state of the instance of the video game may be selected from a limited set of graphics depicting an occurrence in a given place within the video game. The views may include additional content (for example, text, audio, pre-stored video content, or other content) that describes particulars of the current state of the place, beyond the relatively generic graphics. For example, a view may include a generic battle graphic with a textual description of the opponents to be confronted. Other expressions of individual places within the video game are contemplated.

The game engine 112 generates game state data 116 that may be used locally within the game application 110 and may be transmitted to the interactive computing system 130 over network 108. The execution of the instance of the game application 110 may include determining a game state associated with the game application 110. The game state data 116 may facilitate presentation of views of the video game to the users on the user computing systems 102. The game state data 116 may include information defining the virtual environment in which the video game is played. The execution of the game engine is described in further detail herein.

The execution of the game instance may enable interaction by the users with the game application 110 or other users through the interactive computing system 130. The game application 110 may be configured to perform operations in the game instance in response to commands received over network 108 from user computing systems 102. In some embodiments, users may interact with elements in the video game or with each other through the video game.

Users may participate in the video game through client game applications 110 implemented on user computing systems 102 associated with the users. Within the game instance of the video game executed by the game engine 112, the users may participate by controlling one or more of an element in the virtual environment associated with the video game. The user-controlled elements may include avatars, user characters, virtual environment units (for example, troops), objects (for example, weapons, horses, vehicle and so on), simulated physical phenomena (for example, wind, rain, earthquakes, or other phenomena), or other user-controlled elements.

The user-controlled character avatars may represent the users in the virtual environment. The user characters may include heroes, knights, commanders, leaders, generals or any other virtual environment entities that may possess strength, skills, abilities, magic powers, knowledge, or any other individualized attributes. The virtual environment units controlled by the user may include troops or any other game entities that may be trained, recruited, captured, or otherwise acquired by the users in groups or en-mass. The objects controlled by the users may include weapons, vehicles, projectiles, magic items, wardrobes, boots, armor, knapsacks, medicine, healing potion, or any other virtual items that may be employed by the users for interaction within the video game.

The user-controlled element(s) may move through and interact with the virtual environment (for example, user-virtual environment units in the virtual environment, non-user characters in the virtual environment, other objects in the virtual environment). The user controlled elements controlled by or associated with a given user may be created or customized by the given user. The user may have an "inventory" of virtual goods or currency that the user can use (for example, by manipulation of a user character or other user controlled element, or other items) within the virtual environment.

Controls of virtual elements in the video game may be exercised through commands input by a given user through user computing systems 102. The given user may interact with other users through communications exchanged within the virtual environment. Such communications may include one or more of textual chat, instant messages, private messages, voice communications, or other communications. Communications may be received and entered by the users via their respective user computing systems 102. Communications may be routed to and from the appropriate users through server(s) (for example, through application host system 132).

Execution or performance of the user action by the game engine 112 may produce changes to the game state, which may reflect progresses or results of the user actions. In some examples, state changes caused by the execution of the user actions may be recorded in the application data store 106 or data store 134 to facilitate persistency throughout the instance of the video game. In some examples, execution of the user actions may not produce persistent changes to the game state (for example, a user character jumping forward and backward successively may not produce any perceivable game state changes to other users).

A given user may input commands with specific parameters to undertake specific deeds, actions, functions, spheres of actions or any other types of interactions within the virtual environment. For example, the given user may input commands to construct, upgrade or demolish virtual buildings; harvest or gather virtual resources; heal virtual user-controlled elements, non-player entities or elements controlled by other users; train, march, transport, reinforce, reassign, recruit, or arrange troops; attack, manage, create, demolish or defend cities, realms, kingdoms, or any other virtual environment locations controlled by or associated with the users; craft or transport virtual items; interact with, compete against or along with non-player entities or virtual environment elements controlled by other users in combats; research technologies or skills; mine or prospect for virtual resources; complete missions, quests, or campaigns; exercise magic power or cast spells; or perform any other specific deeds, actions, functions, or sphere of actions within the virtual environment. In some examples, the given user may input commands to compete against elements in an environment within the virtual environment—for example, Player vs. Environment (PvE) activities. In some examples, the given user may input commands to compete against each other within the virtual environment—for example, Player vs. Player (PvP) activities.

The instance of the video game may include virtual entities automatically controlled in the instance of the video game. Such virtual entities may or may not be associated with any user. As such, the automatically controlled virtual entities may be generated or developed by artificial intelligence configured with the game application 110 or server(s) interactive computing system 130 by a provider, administrator, moderator, or any other entities related to the video game. These automatically controlled entities may evolve within the video game free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server(s) (for example, application host system 132). As used herein, such automatically controlled virtual environment entities in the instance of the video game are referred to as "non-player entities."

In an online game, the instance of the video game may be persistent. That is, the video game may continue on whether or not individual users are currently logged in or participating in the video game. A user that logs out of the video game and then logs back in some time later may find the virtual environment or the video game has been changed through the interactions of other users with the video game during the time the user was logged out. These changes may include changes to the simulated physical space, changes in the user's inventory, changes in other users' inventories, changes experienced by non-user characters, or other changes.

Interactive Computing System

The interactive computing system 130 may include application host system(s) 132, a data store 134, and a tournament management system 120. The interactive computing system 130 may include one or more computing systems configured to execute a portion of the game application 110. The interactive computing system 130 may enable multiple users or computing systems to access a portion of the game application 110 executed or hosted by the interactive computing system 130. The interactive computing system 130 can have one or more game servers that are configured to host online video games. For example, the interactive computing system 130 may have one or more game servers that are configured to host an instanced (for example, a first person shooter multiplayer match) or a persistent virtual environment (for example, a multiplayer online roll playing game). The virtual environment may enable one or more users to interact with the environment and with each other in a synchronous or asynchronous manner. In some cases, multiple instances of the persistent virtual environment may be created or hosted by one or more game servers. A set of users may be assigned to or may access one instance of the virtual environment while another set of users may be assigned to or may access another instance of the virtual environment. In some embodiments, the interactive computing system 130 may execute a hosting system for executing various aspects of a game environment. For example, in one embodiment, the game application 110 may be a competitive game, such as a first person shooter or sports game, and the interactive computing system 130 can provide a dedicated hosting service (such as, through the game servers) for hosting multiplayer game instances or facilitate the creation of game instances hosted by user computing devices.

Haptics Module

The haptics module 108 can be executed on the user computing system 102 and/or the interactive computing system 130. The haptics module can be configured to manage operation of the haptics feedback transcription system. The haptics module can include a translating shim that functions as a library that communicates with a game application for the purpose of managing language translation. In some embodiments, a language translation is any auditory or text-based translation from one language to another, including Morse Code. The haptic module can include a transcribing shim that can transcribe information into haptic feedback sequences. As used herein, the terms "transcription" and "transcribing" can refer to the process of converting data from format to another. For example, the transcribing shim can transcribe text data into haptic feedback sequences, transcribe Morse code (that was previously translated from text) into haptic feedback sequences, and/or transcribe user interface elements into haptic feedback sequences, and/or transcribe other types of data to haptic feedback sequences.

The game application can generate game states that present a player with text or dialogue. The haptics module 108 can be configured to transcribe the text or dialogue into a haptic feedback sequence. Additionally, some game states present a player with player buttons choices to perform certain actions. The haptics module can perform a transcription of available player button choices to haptic feedback sequences. The functionality and execution of the haptics module will be further described herein.

Haptic Feedback of Player Buttons

FIG. 2A illustrates an embodiment of a chart illustrating haptic feedback transcriptions corresponding to buttons on an input device, such as a controller. The chart of FIG. 2 includes a list of Player Buttons 200 of a controller corresponding to sets of respective haptic sequences 200a.

Haptic Feedback Signal Composition of Player Buttons

In the embodiment of haptic feedback sequences 200(a) of FIG. 1, the player buttons 200, illustrated as eight selectable buttons (items 201, 202, 203, 204, 205, 206, 207, and 208), can be conveyed as a combination of high binary signals (items 201(a), 201(b), 201(c), 202(a), 202(b), 203(a), 204(a), 204(c), 206(c), 207(b), 208(b), 208(c)) or low binary signals (items 202(c), 203(b), 203(c), 204(b), 205(a), 205(b), 205(c), 206(a), 206(b), 207(a), 207(c), 208(a)).

Each player button has a different haptic sequence, which in the illustrated embodiment is configured as a series of three sequential binary signals. The illustrated buttons and haptic sequences are used by way of example, not limitation, to demonstrate the conveyance of selectable controlling input for eight buttons of an input device of a player. As further described herein, the game application can implement a unique or known binary signals to represent a plurality of selectable controlling input.

To appropriately convey haptic feedback sequences 200 (a) to players, the three binary signals are performed as haptic feedback on a player's input device over some period of time 200(c). Since haptic feedback sequences 200(a) are three binary signals, time 200(c) is illustrated with three time increments (items T(a), T(b) and T(c)) to represent the conveyance of each binary signal to an input device. In some embodiments, the time 200(c) (including T(a), T(b) and T(c)) in which the haptic feedback sequences 200(a) occur can be configured by the player, such that they occur at a periodic rate that best suits a player's ability to interpret haptic feedback.

The high and low signals illustrated in FIG. 2A, and the proceeding figures, are configurable as any of the two actuator signal types. For example, the haptic signals can be vibration functionality of a controller. The low binary signal can be a short vibration pulse and the high binary signal can be a long vibration pulse. In order to indicate player button A 201, the game application would trigger three high binary signals, which would result in three long vibration pulses.

In some embodiments, a player can configure a game application to perform a particular actuator signal based one or more circumstantial parameters. For example, a circumstantial parameter to configure a game application to perform a particular actuator type can include, but is not limited to a game mode, urgency for input response, player camera perspective, type of virtual action or virtual effect to the game application associated and caused by a button selection, odds at performing an action successfully associated with a button selection, and other configurations of the like.

Processing Haptic Feedback of Player Buttons

FIG. 2B depicts a block diagram of a haptic feedback transcribing process 210. The process can be performed by a game application 110.

At block 211, during the course of a game session in a game application, an in-game event associated with at least one player input control within the game application. In some instances, the event may be for the player to push a button within the game application. The player can be presented with selectable button choices to perform a virtual action within the virtual environment. The player can be presented with selectable button choices simultaneously or independently from other players, depending upon the circumstances of the game. In some instances, the event may be inputs provided by other players within the game that are communicated to the player. The game application may perform the steps of the haptic feedback transcribing for any number of players participating in the game application.

At block 212, the game application can transcribe the inputs controls associated with the event into at least one player haptic feedback sequence. The game application can transcribe the player input controls (e.g., player buttons) associated with the event into a haptic feedback sequence using the haptic module.

At block, 213, once transcribed, the game application is configured to send the haptic feedback sequence to the player controller to be output to the player. The haptic feedback sequence can be generated that indicates that the user can press one of a plurality of buttons. In some instances, the haptic feedback sequence may indicate buttons pressed by other players within the virtual environment. In some embodiments, the haptic feedback sequence can be sent to any number of controller devices and not limited to a controller for a specific player. In some embodiments, the haptic feedback sequence may be sent to a plurality of different controller devices associated with one or more players. For example, the haptic feedback sequence may be sent to a device that is positioned on the player's body, such as a vest that can provide haptic feedback to the player. The device may not have the capability of providing responsive feedback within the game, and other controller devices are used by the player to provide input, such as a handheld controller.

Multiplayer Interactive Area

FIG. 3 illustrates a multiplayer interactive area with player buttons in game application.

The interactive area 300 illustrates a game session between two players, wherein a first player is presented with selectable button choices above virtual characters 311, 312, and 313. The selectable button choices above virtual characters 311, 312, and 312 are associated with a virtual action that could cause the controlled character of the first player 310 to virtually interact with a selectable character (items 311, 312, or 313).

A second player 320 in the interactive area is presented with selectable button choices above characters 321 and 322. The selectable button choices above virtual characters 321 and 322 are associated with a virtual action that could cause the controlled character of the second player 320 to virtually interact with a selectable character (items 321 or 322).

In one embodiment, when both players are presented with selectable button choices a game application could perform the haptic feedback transcription process illustrated in FIG. 2B for a player. In which case, for the first player 310, the process would result in a haptic output to the first and second player's controllers in response to the current in-game event as further described with respect to FIG. 4. In some embodiments, an interactive area 300 may be multiplayer game session that is played remotely, such that the game application only provides views of selectable button choices available to their character.

Multiplayer Haptic Feedback Output

FIG. 4 depicts output timelines for player button transcriptions as haptic feedback sequences. The illustrations and examples of selectable button choices provided in FIG. 3 for a first and second player of a game application are followed.

A first button transcription graph 400 for a first player of a game application is illustrated across timeline 400(a). In interactive area 300, a first player of the game application is presented with selectable button choices above virtual characters 311, 312, and 312. The first player selectable button choices are illustrated in FIG. 4 as buttons 401, 402, and 403 respectively.

Timeline 400(A) includes the haptic feedback sequences of buttons 401, 402, and 403 sent to the controller device of the first player of the game application. The haptic feedback sequence of button A (item 401) is composed of the three high signals 401(a), 401(b), and 401(c). The haptic feedback sequence of button B (item 402) is composed of the two high signals 402(a) and 402(b), and the low signal 402(c). The haptic feedback sequence of button C (item 403) is composed of the two high signals 403(a) and 403(c), and a low signal 403(b).

A second button transcription graph 410 for a second player of a game application is illustrated across timeline 410(a). In interactive area 300, a second player of the game application is presented with selectable button choices above virtual characters 321 and 322. The first player selectable button choices are illustrated in FIG. 4 as buttons 411 and 412 respectively.

Timeline 410(A) includes the haptic feedback sequences of buttons 411 and 412 to be sent to the controller device of the second player of the game application. The haptic feedback sequence of button D (item 411) is composed of the two high signals 411(a) and 411(c), and a low signal 411(b). The haptic feedback sequence of button LB (item 412) is composed of the three low signals 412(a), 412(b), and 412(c).

By sending selectable button choices to a user's controller device as a haptic feedback sequence, the game application is enabled to convey button choices efficiently and effectively to users who are visually impaired. A visually impaired user will more appropriately interpret the selectable button choices that are currently available to them because they will be able to feel the actuation of the controller device representing selectable button choices.

The timelines illustrate example output sequences to illustrate the conveyance of haptic feedback sequence signal sent to an actuator of a controller device.

Haptic Feedback of Morse Code

FIG. 5 depicts a block diagram of a process for a text to Morse haptic feedback transcribing process 500. The game application 110 can be configured to communicate with the haptic module 108 to perform the process. The haptic module may be executing locally on the user computing device within the game application or executing remotely on a server, such as on the interactive computing system.

At block 501, the game application can output text to a haptic module. During the course of a game in a game application, text becomes displayed to the user in the form of dialogue subtitles, in-game dialogue selection, or user interface text. When text is displayed to the user, the game application can be configured to push the text to the haptic module.

The haptic module can function as a shim within the game application. The haptic module can be an API that the game application 110 can call to translate language text or dialogue. For example, the haptic module can translate between a spoken language to another spoken language or to a gesture language (displayed as visual icons in a sequence), and common code languages, such as Morse code. The haptic module can either be a local API or server side API.

At block 511, the haptic module can receive text pushed from the game application. At block 512, the haptic module can translate the received text into Morse Code. The translation of the text into Morse code can include the translation of the text into a format that can be output by the input device of the user. For example, the controller can have a vibration actuator and the haptic module can generate commands to be output to the vibration actuator that are interpreted as a Morse code output by a player using the controller. At block 513, the haptic module is configured to send Morse code output to the game application.

At block 502, the game application receives the Morse code output sequence. At block 503, the game application outputs the Morse code output sequence as a Haptic Feedback Sequence to the controller device of the user.

Game Application Menu

FIG. 6 illustrates an embodiment of a game application menu. A virtual interactive menu can be a user interface that enables a user to make one or more selections for displaying a player profile, launching a game mode, lobbying with friends locally or remotely, visiting a virtual store, changing configuring settings, or performing other functions within the game application. The user interface menu of a game application includes selectable elements, including, but not limited to, icons, buttons, text fields, headers, photos, animations, videos, and other UI elements.

Text Pushing

The game application can be configured to push the text of the headers (items 601, 602, 603) and main elements (610, 611, and 612) of a virtual interactive menu to the haptic module. The text in the headers (items 601, 602, 603) and main elements (610, 611, and 612) can be pushed to the haptic module as a user navigates through each or when the virtual interactive menu is displayed to the user.

For example, when the multiplayer header 602 of the virtual interactive menu is navigated to by a user, the multiplayer game mode selection tiles (items 610, 611, 612) are displayed in the game application menu 600. Thereafter, when a user hovers over a sub menu element, the text of the element can be sent to the haptic module. For instance, when a user hovers over "Team Deathmatch" 610, the text within the tile is sent to haptic module to determine a Morse haptic feedback sequence transcription of the text to the controller device of the user.

Game application Menu Text Transcription

FIG. 7 illustrates an output timeline of a text translation as a Morse haptic feedback sequence. In some embodiments, when a user navigates over the header elements of a game application menu, the text of the element is pushed to a haptic module (as illustrated by the process of FIG. 5). For example, when a user hovers over the "Multiplayer" header element 602 of game application menu 600, the game application pushes the text "Multiplayer" to the haptic module to be translated as Morse code. The Morse code for "Multiplayer" is then received by the game application and transcribed into a Morse Code Haptic Feedback Sequence representing the word "Multiplayer".

The text to Morse transcription graph 700 illustrates an output timeline 700(a) of the Morse code haptic feedback sequence for the first three letters of the word "Multiplayer" sent to a controller device of a user of game application. The letter "M" 701 is translated into the International Morse Code translation of two high signals 701(a) and 701(b), occurring at time increments T1 and T2 respectively. The letter "U" 703 is translated into the International Morse Code translation of two low signals 702(a) and 702(b), and one high signal 702(c) occurring at time increments T4, T5, and T6 respectively. The letter "L 703 is translated into the International Morse Code translation of a low signals 703(a) followed by a high signal 703(b) and ending with two low signals 703(c) and 703(d) occurring at time increments T8, T9, T10, and T11 respectively.

Haptic Feedback of Player Buttons and Morse Code

FIG. 8 depicts a block diagram of a process 800 for player button and text transcribing as haptic feedback with a transition sequence.

In some embodiments, when selectable button choices and user interface text are pushed and transcribed into haptic feedback sequences, a transitional haptic feedback sequence identifying a haptic feedback type is inserted between each type of haptic feedback sequences to enable the game application to provide a user a means to delineate differing haptic feedback signals.

At block 801, the game application can be configured to push text and player buttons simultaneously to the haptic module. During the course of a game in a game application, player buttons and text becomes displayed to the user in the form of dialogue subtitles, in-game dialogue selection, or user interface text. When text is displayed to the user, the game application can be configured to push the text to the haptic module.

At block 811, the haptic module can receive text pushed from the game application. At block 812, the haptic module can translate the received text into Morse Code. The translation of the text into Morse code can include the transcription of the text into a format that can be output by the input device of the user. For example, the controller can have a vibration actuator and the haptic module can generate commands to be output to the vibration actuator that are interpreted as a Morse code output by a player using the controller, such as a binary output that includes a high and low output. At block 813, the haptic module is configured to send Morse code output to the game application.

At block 802, the game application receives the Morse code output sequence. At block 804, the game application outputs the Morse code output sequence as a Haptic Feedback Sequence to the controller device of the user. At block 803, the game application can transcribe players' buttons as a haptic feedback sequence. At block 805, the game application determines the order for the Morse haptic feedback and the button haptic to be sent to the controller device of user.

At block 806, after the order is determined, the game application inserts a transitional haptic feedback sequences between the Morse Haptic Feedback and the Button Haptic Feedback sequence to inform the user, by way of unique haptic feedback sequence, the type of haptic feedback sequence occurring. At block 807, when transitional haptic feedback sequences are inserted, the game application sends full haptic feedback sequences to the controller device of a user. The sequence is further illustrated with respect for FIGS. 9 and 10.

Selectable Dialogue in a Game Application

FIG. 9 illustrates a virtual conversation with player button selections tied to dialogue selections in a game application.

In some game applications, players will be given an option to engage in conversations with other in game characters, such as nonplayable characters or other players. Within these conversations, players may be provided with a number of dialogue selections. In some embodiments, dialogue selection interfaces can be provided to a player through a scrollable list, selectable tiles, or keyed to a particular input keys or buttons. The present invention illustrates one embodiment for a dialogue selection interface by way of example, but is not limited to a single dialogue selection interface as illustrated. One skilled in the art will understand that many variations of a dialogue selection interface can be used.

The dialogue choices (items 910, 920, 930, 940) can be keyed to specific player buttons (items 911, 921, 931, 941) centered around a dialogue choice wheel 905. The dialogue choice wheel 905 can provide a player with a centralized user interface element for selecting dialogue choices within the game application.

During the course of a virtual conversation, a first player 900 can respond to the dialogue of second player 901 by making a dialogue selection from the dialogue choice wheel 905. Among embodiments, a second player 901 can be either an actual player or a nonplayable character in the game application.

The dialogue choices (items 910, 920, 930, 940) are the first player's 900 response to a second player's 901 dialogue sequence. When the dialogue choices (items 910, 920, 930, 940) are first presented to the user during the course of the conversation in the game application, such as the dialogue choice wheel 905 first appearing to the user, the game application can push the player buttons (items 911, 921, 931, 941) with their respective dialogue choices (items 910, 920, 930, 940) to the haptic module for transcribing.

If the first player 900 chooses to respond "Yes" 910 to the second player's 901 dialogue, the first player 900 will press button "C" 911. If the first player 900 chooses to respond "Maybe" 940 to the second player's 901 dialogue, the first player 900 will press button "A" 941. If the first player 900 chooses to respond "No" 930 to the second player's 901 dialogue, the first player 900 will press button "B" 931. If the first player 900 chooses not to respond [item 920, "No Answer"] to the second player's 901 dialogue, the first player 900 will press button "D" 921.

Selectable Dialogue Haptic Feedback Output

FIG. 10 illustrates an example embodiment of a transitional haptic feedback sequence and pulse sequence.

FIG. 10 depicts an output graph of Haptic Feedback with Transitional and Pulse Sequences 1000. The figure illustrates the conveyance of player button "A" 941 and the respective dialogue cue "Maybe" 940 from FIG. 9 to a first player of a game application when the dialogue choice wheel 905 is first presented to the user.

As the dialogue choice wheel 905 is presented to the user, the player button "A" 941 and the respective dialogue cue "Maybe" 940 are pushed to the haptic module for transcription. When received by the haptic module for transcription, the player button "A" 941 is conveyed as three long haptic feedback signals (items 941(a), 941(b) and 941(c) at times T1, T2, and T3), followed by a transition signal 1001 as the haptic feedback sequence (items 1001(a), 1001(b), 1001(c), 1001(d) at times T5, T6, T7 and T8) that denotes to a user that the upcoming haptic feedback sequence will be for dialogue. The internal module then continues to convey dialogue "Maybe" 940 to the user via the haptic feedback sequence of the letters "M" (items 940(a) and 940(b) at times T10 and T11) and "a" (items 940(c) and (940(d) at times T13 and T14).

Situational Pulse

The graph 1000 also conveys an "Situational Pulse" that occurs in unison with first player's haptic feedback. A "Situational Pulse" can be an additional haptic feedback signal that is sent to the player periodically. Based on the frequency of the period of the Situational Pulse (e.g., how often the pulse occurs) and the type of pulse, the game application can convey to a user that a particular event is occurring. For example, a Situational Pulse that has shorter period occurs more often and can denote that an alarming or urgent event is occurring. A Situational Pulse that has a longer period occurs less often and can denote that an unurgent event is occurring, such as a player engaging in a virtual conversation or traveling to virtual destination.

FIG. 10 illustrates the periodic sending of Situational Pulses (Items P1, P2, P3, P4) at T2, T6, T10, and T14. The periodic frequency between the time of each Situational Pulse (Items P1, P2, P3, P4) is a difference of T4 is meant to convey to the user that a conversation is occurring in the interactive environment. This periodic frequency of a Situational Pulse denoting the conveyance of a conversation occurring to a player is shown by way of example, and is not limited to the time period illustrated.

One skilled in the art will appreciate that any periodic frequency, whether consistent or changing over time, can denote to a user that particular event is occurring. For example, the periodic frequency can start at a consistent rate but become shorter (e.g., speed up) to denote to a player that the time to perform an action for conveyed event is ending. In some embodiments, the Situational Pulse can occur on separate actuator than the haptic feed that is transcribing text and dialogue to a user. For example, the Situational Pulse can occur on the left actuator of a controller while the haptic feedback t transcriptions occur on the right side of a controller. Alternatively, the Situational Pulse can be sent to a secondary capable device.

The time iteration "T" as used in the figures of the present invention is an arbitrary time increment that can be predefined in the game application, or defined by a player of the game application based on their personal preference of being able to feel and interpret haptic feedback from their respective input devices.

The conveyance of haptic feedback need not be limited to the device a player is using to select input (e.g., keyboard, mouse, controller,), and can be conveyed to the player via multiple devices, such as both an input device and wearable device containing actuators.

Computing Device

FIG. 11 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and external components. A media reader 22 is included that communicates with media 12. The media reader 22 may be an optical disc reader capable of reading optical discs, such as CD-ROM or DVDs, or any other type of reader that can receive and read data from media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data. In addition to storage 40 and removable storage media 44, computing device 10 is also shown including ROM (Read-Only Memory) 46 and RAM 48. RAM 48 may be used for data that is accessed frequently.

User I/O 34 is used to send and receive commands between processing unit 20 and user devices, such as keyboards or game controllers. In some embodiments, the user I/O can include a touchscreen. The touchscreen can be capacitive touchscreen, a resistive touchscreen, or other type of touchscreen technology that is configured to receive user input through tactile inputs from the user. Display I/O 36 provides input/output functions that are used to display images. Network I/O 38 is used for input/output functions for a network. Network I/O 38 may be used during execution, such as when a client is connecting to a server over a network.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that the above description is intended to be illustrative, and not restrictive. Many other implementations will be apparent to those of skill in the art upon reading and understanding the above description. The scope of the present disclosure should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The invention claimed is:

1. A computer-implemented method for generating haptic feedback sequences during a gameplay session of a game application, the method comprising:
   by a computing system comprising at least one hardware processor configured with computer executable instructions,
      executing an instance of a gameplay session of a game application, the instance of the gameplay session comprising a virtual environment and one or more user controlled virtual entities;
      generating an in-game event within the virtual environment comprising controller inputs displayed to a user, wherein the controller inputs indicate one or more input controls of a separate controller device a user can actuate in response to the in-game event;
      transcribing the controller inputs displayed to a user into one or more haptic feedback sequences, wherein each of the one or more haptic feedback sequences comprise a series of signals that identifies a controller input, wherein each controller input is associated with a different haptic feedback sequence; and
      sending the one or more haptic feedback sequences to at least one controller device, wherein the series of signals of the one or more haptic feedback sequences are configured to actuate at least one haptic actuator on the at least one controller device, wherein each haptic feedback sequence generates a different haptic output sequence for the at least one haptic actuator.

2. The method of claim 1 further comprising:
   generating text within the virtual environment;
   translating the text to Morse code; and
   transcribing the Morse code into one or more Morse haptic feedback sequences.

3. The method of claim 2 further comprising determining an order for the one or more haptic feedback sequences and the one or more Morse haptic feedback sequences to be sent to a controller device of the user operating in conjunction with the computing system executing the game application.

4. The method of claim 3 further comprising inserting one or more transitional haptic feedback sequences between each of the one or more haptic feedback sequences and the one or more Morse haptic feedback sequences to create a full haptic feedback sequence.

5. The method of claim 2, wherein transcribing the text displayed to the user includes pushing the text displayed to a user to a translating shim, the translating shim configured with machine-readable instructions for identifying the text displayed to the user and calling an external API for translating the identified the text displayed to the user into Morse code.

6. The method of claim 2, wherein a full haptic sequence is sent to a plurality of controller devices operating in conjunction with the computing system executing the game application to support multiple users in a game application.

7. The method of claim 2, wherein the Morse haptic feedback sequence comprises machine readable instructions for physically rotating one or more actuators in the controller device operating in conjunction with the computing system.

8. The method of claim 1, wherein the haptic feedback sequence comprises machine readable instructions for physically rotating one or more actuators in the controller device operating in conjunction with the computing system.

9. The method of claim 1, wherein the haptic feedback sequence comprises machine readable instructions for actuating a plurality of haptic actuators on the controller device.

10. A system comprising:
    at least one hardware processor configured with machine-readable instructions executable on a computing device that configure the at least one hardware processor to:
       execute an instance of a gameplay session of a game application, the instance of the gameplay session comprising a virtual environment and one or more user controlled virtual entities;
       generate an in-game event within the virtual environment comprising controller inputs displayed to a user, wherein the controller inputs indicate one or more input controls of a separate controller device a user can actuate in response to the in-game event;
       transcribe the controller inputs displayed to a user into one or more haptic feedback sequences, wherein each of the one or more haptic feedback sequences comprise a series of signals that identifies a controller input, wherein each controller input is associated with a different haptic feedback sequence; and
       send the one or more haptic feedback sequences to at least one controller device, wherein the series of signals of the one or more haptic feedback sequences are configured to actuate at least one haptic actuator on the at least one controller device, wherein each haptic feedback sequence generates a different haptic output sequence for the at least one haptic actuator.

11. The system of claim 10, wherein the machine-readable instructions are further configured to:
    generate text within the virtual environment;
    translate the text to Morse code; and
    transcribe the Morse code into one or more Morse haptic feedback sequences.

12. The system of claim 11, wherein the machine-readable instructions are further configured to determine an order for the one or more haptic feedback sequences and the one or more Morse haptic feedback sequences to be sent to a controller device of the user operating in conjunction with the computing device executing the game application.

13. The system of claim 12, wherein the machine-readable instructions are further configured to insert one or more transitional haptic feedback sequences between each of the one or more haptic feedback sequences and the one or more Morse haptic feedback sequences to create a full haptic feedback sequence.

14. The system of claim 13, wherein the haptic feedback sequences comprises machine readable instructions for actuating a first haptic actuator on the controller device and the transitional haptic feedback sequences comprises machine readable instructions for actuating a second haptic actuator on the controller device.

15. The system of claim 11, wherein transcribing the text displayed to the user includes pushing the text displayed to a user to a translating shim, the translating shim configured with machine-readable instructions for identifying the text displayed to the user and calling an external API for translating the identified the text displayed to the user into Morse code.

16. The system of claim 11, wherein a full haptic sequence is sent to a plurality of controller devices operating in conjunction with the computing device executing the game application to support multiple users in a game application.

17. The system of claim 11, wherein the Morse haptic feedback sequence comprises machine readable instructions for physically rotating one or more actuators in the controller device operating in conjunction with the computing device.

18. The system of claim 10, wherein the haptic feedback sequence comprises machine readable instructions for physically rotating one or more actuators in the controller device operating in conjunction with the computing device.

19. The system of claim 10, wherein the haptic feedback sequence comprises machine readable instructions for actuating a plurality of haptic actuators on the controller device.

20. The system of claim 10, wherein the instance of the gameplay session of the game application is a shared state of the game application executing on multiple computing devices.

* * * * *